US012634878B2

(12) United States Patent　　　　　(10) Patent No.:　US 12,634,878 B2
Akkarakaran et al.　　　　　　　　　　(45) Date of Patent:　May 19, 2026

(54) BANDWIDTH INDICATION IN POSITIONING MEASUREMENT REPORTS

(71) Applicant: QUALCOMM Incorporated, San Diego, CA (US)

(72) Inventors: Sony Akkarakaran, Poway, CA (US); Tao Luo, San Diego, CA (US); Alexandros Manolakos, Escondido, CA (US); Sven Fischer, Nuremberg (DE); Guttorm Ringstad Opshaug, Redwood City, CA (US)

(73) Assignee: Qualcomm Incorporated, San Diego, CA (US)

( * ) Notice: Subject to any disclaimer, the term of this patent is extended or adjusted under 35 U.S.C. 154(b) by 547 days.

(21) Appl. No.: 16/999,596

(22) Filed: Aug. 21, 2020

(65) Prior Publication Data

US 2021/0058890 A1　　Feb. 25, 2021

Related U.S. Application Data

(60) Provisional application No. 62/891,139, filed on Aug. 23, 2019.

(51) Int. Cl.
*H04W 24/10*　　　(2009.01)
*G01S 5/02*　　　(2010.01)
(Continued)

(52) U.S. Cl.
CPC ......... *H04W 64/006* (2013.01); *G01S 5/0236* (2013.01); *H04L 5/0051* (2013.01);
(Continued)

(58) Field of Classification Search
CPC ..... H04W 64/006; H04W 8/24; H04W 24/10; H04W 88/18; H04W 64/00;
(Continued)

(56) References Cited

U.S. PATENT DOCUMENTS 9,313,765　B2　　4/2016　Lim et al.
10,218,471　B1　　2/2019　Kumar et al.
(Continued)

FOREIGN PATENT DOCUMENTS

CN　　　　109479278　A　　3/2019
EP　　　　　3496483　A1　　6/2019

OTHER PUBLICATIONS

International Search Report and Written Opinion—PCT/US2020/047587—ISA/EPO—Nov. 26, 2020.
(Continued)

*Primary Examiner* — Derrick W Ferris
*Assistant Examiner* — M Mostazir Rahman
(74) *Attorney, Agent, or Firm* — Muncy, Geissler, Olds & Lowe, P.C.

(57) ABSTRACT

Disclosed are techniques for wireless communication. In an aspect, a UE or base station performs, during a positioning session, a measurement of a first positioning reference signal (PRS) within a first bandwidth part (BWP), performs, during the positioning session, a measurement of a second PRS within a second BWP, transmits, to a location server, a measurement report including the measurement of the first PRS and the measurement of the second PRS, and transmits, to the location server, an indication of the first BWP, the second BWP, or both.

28 Claims, 13 Drawing Sheets

(51) Int. Cl.

| | |
|---|---|
| *H04L 5/00* | (2006.01) |
| *H04W 8/24* | (2009.01) |
| *H04W 64/00* | (2009.01) |

(52) U.S. Cl.

CPC ............. *H04L 5/0092* (2013.01); *H04W 8/24* (2013.01); *H04W 24/10* (2013.01)

(58) Field of Classification Search

CPC .............. H04W 72/0453; G01S 5/0236; G01S 5/0036; G01S 1/045; G01S 1/20; G01S 5/0221; H04L 5/0051; H04L 5/0092; H04L 5/0053; H04L 5/0048; H04L 5/0094

See application file for complete search history.

(56) References Cited

U.S. PATENT DOCUMENTS

| | | | | |
|---|---|---|---|---|
| 2018/0054792 | A1 | 2/2018 | Lee et al. | |
| 2021/0282111 | A1* | 9/2021 | Yamada | .................... G01S 5/06 |
| 2021/0320769 | A1* | 10/2021 | Cha | ....................... H04W 48/12 |
| 2022/0050163 | A1* | 2/2022 | Si | .......................... H04W 24/10 |
| 2022/0131727 | A1* | 4/2022 | Khoryaev | ............. H04L 27/261 |
| 2022/0229145 | A1* | 7/2022 | Berggren | ............. H04L 5/0082 |
| 2022/0416975 | A1* | 12/2022 | Ren | ................... H04L 27/26025 |

OTHER PUBLICATIONS

Intel Corporation: "Offline Discussion Outcome on DL Reference Signals for NR", 3GPP TSG RAN WG1 Meeting #96bis, R1-1905847, Xi'an, China, Apr. 8-12, 2019, pp. 1-12.

Qualcomm Incorporated: "Summary of 7.2.10.4: PHY Procedures for Positioning Measurements", 3GPP TSG-RAN WG1 Meeting #97, R1-1907675 (FL Summary for 7.2.10.4—PHY Procedures for Positioning Measurements), 3rd Generation Partnership Project, Mobile Competence Centre, 650, Route Des Lucioles, F-06921,vol. RAN WG1, No. Reno, Nevada, USA, May 13, 2019-May 17, 2019, May 16, 2019, XP051739964, 18 pages.

Taiwan Search Report—TW109128828—TIPO—Oct. 18, 2023.

Intel Corporation: "Physical Layer Measurements for NR Positioning", 3GPP TSG RAN WG1 Meeting #98, R1-1908661, Intel—Measurements, 3rd Generation Partnership Project, Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019, pp. 1-20, XP051765269.

Qualcomm Incorporated: "Summary #2 of 7.2.10.4: PHY Procedures for Positioning Measurements", 3GPP TSG-RAN WG1 Meeting #97, R1-1907841, Reno, Nevada, USA, May 13, 2019-May 17, 2019, May 17, 2019, pp. 1-17.

Samsung: "Discussion on Necessity and Details for Physical-Layer Procedures to Support UE/gNB Measurements", 3GPP TSG RAN WG1 #97, R1-1906910, Reno, USA, May 13, 2019-May 17, 2019, May 3, 2019, pp. 1-8.

* cited by examiner

250

270

272

LMF

SLP

260

266

5GC

AMF

SMF

UPF

264

262

265

265

263

263

220

NEW RAN

224 ng-eNB gNB

310  WWAN Transceiver
312  Receiver(s)
314  Transmitter(s)

WLAN Transceiver
Receiver(s)
Transmitter(s)

324

SPS Receiver
330

334  Data Bus

344

340  Memory
342  BWP Indication Component

Sensor(s) (e.g., accelerometer, magnetometer, gyroscope, etc.)

Processing System (e.g., ASIC(s), FPGA(s), DSP(s), etc.)
332

346  User Interface

306

390

Network
Interface(s)

Data Bus — 392

Memory

BWP
Indication
Component

Processing System
(e.g., ASIC(s),
FPGA(s),
DSP(s), etc.) — 394

396   398

900

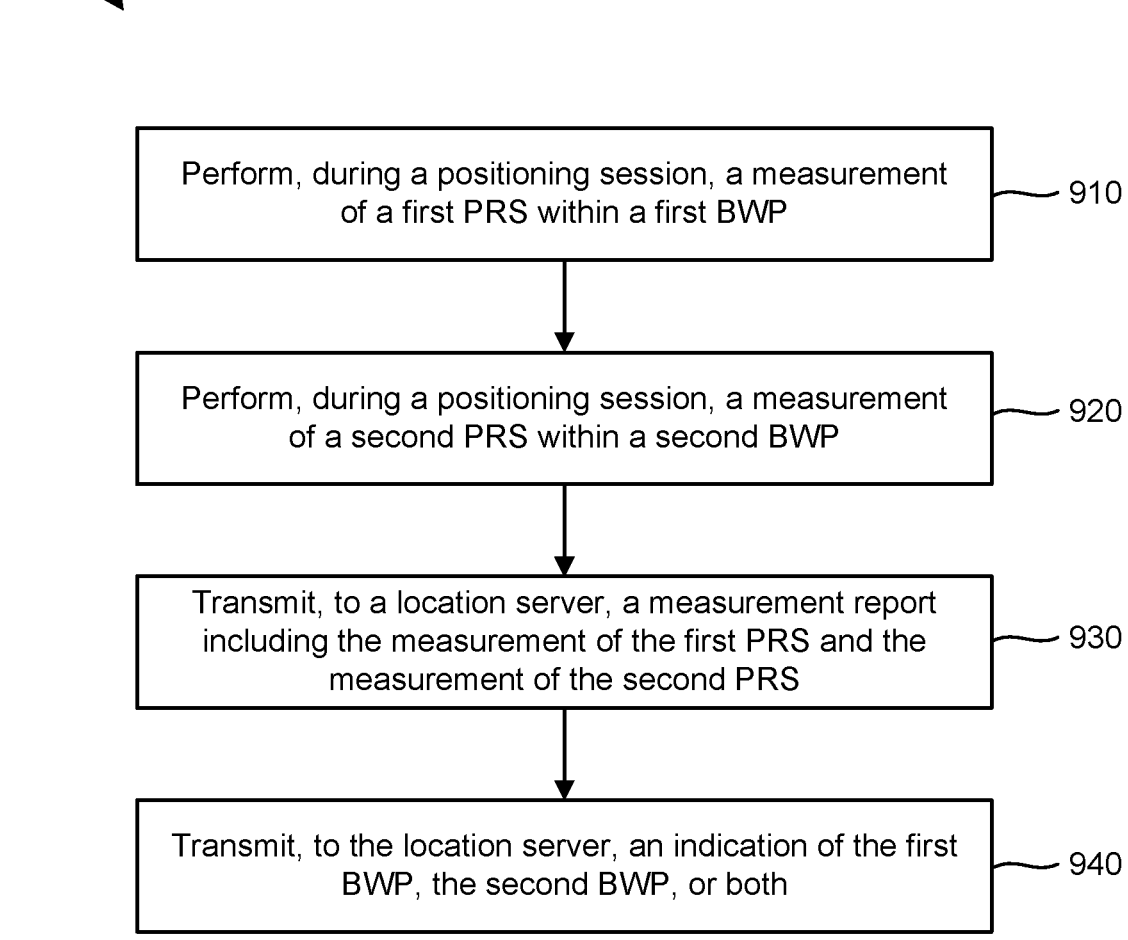

Perform, during a positioning session, a measurement of a first PRS within a first BWP — 910

Perform, during a positioning session, a measurement of a second PRS within a second BWP — 920

Transmit, to a location server, a measurement report including the measurement of the first PRS and the measurement of the second PRS — 930

Transmit, to the location server, an indication of the first BWP, the second BWP, or both — 940

*FIG. 9*

BANDWIDTH INDICATION IN POSITIONING MEASUREMENT REPORTS

CROSS-REFERENCE TO RELATED APPLICATIONS

The present application for patent claims the benefit of U.S. Provisional Application No. 62/891,139, entitled "BANDWIDTH INDICATION IN POSITIONING MEASUREMENT REPORTS," filed Aug. 23, 2019, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a receiver device includes performing, during a positioning session, a measurement of a first positioning reference signal (PRS) within a first bandwidth part (BWP), performing, during the positioning session, a measurement of a second PRS within a second BWP, transmitting, to a location server, a measurement report including the measurement of the first PRS and the measurement of the second PRS, and transmitting, to the location server, an indication of the first BWP, the second BWP, or both.

In an aspect, a receiver device includes a memory, at least one transceiver, and at least one processor communicatively coupled to the memory and the at least one transceiver, the at least one processor configured to perform, during a positioning session, a measurement of a first PRS within a first BWP, perform, during the positioning session, a measurement of a second PRS within a second BWP, cause the at least one transceiver to transmit, to a location server, a measurement report including the measurement of the first PRS and the measurement of the second PRS, and cause the at least one transceiver to transmit, to the location server, an indication of the first BWP, the second BWP, or both.

In an aspect, a receiver device includes means for performing, during a positioning session, a measurement of a first PRS within a first BWP, means for performing, during the positioning session, a measurement of a second PRS within a second BWP, means for transmitting, to a location server, a measurement report including the measurement of the first PRS and the measurement of the second PRS, and means for transmitting, to the location server, an indication of the first BWP, the second BWP, or both.

In an aspect, a non-transitory computer-readable medium storing computer-executable instructions includes computer-executable instructions comprising at least one instruction instructing a receiver device to perform, during a positioning session, a measurement of a first PRS within a first BWP, at least one instruction instructing the receiver device to perform, during the positioning session, a measurement of a second PRS within a second BWP, at least one instruction instructing the receiver device to transmit, to a location server, a measurement report including the measurement of the first PRS and the measurement of the second PRS, and at least one instruction instructing the receiver device to transmit, to the location server, an indication of the first BWP, the second BWP, or both.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 2A and 2B illustrate example wireless network structures, according to various aspects.

FIG. 9 illustrates an example method of wireless communication, according to aspects of the disclosure.

DETAILED DESCRIPTION

Figure 1:
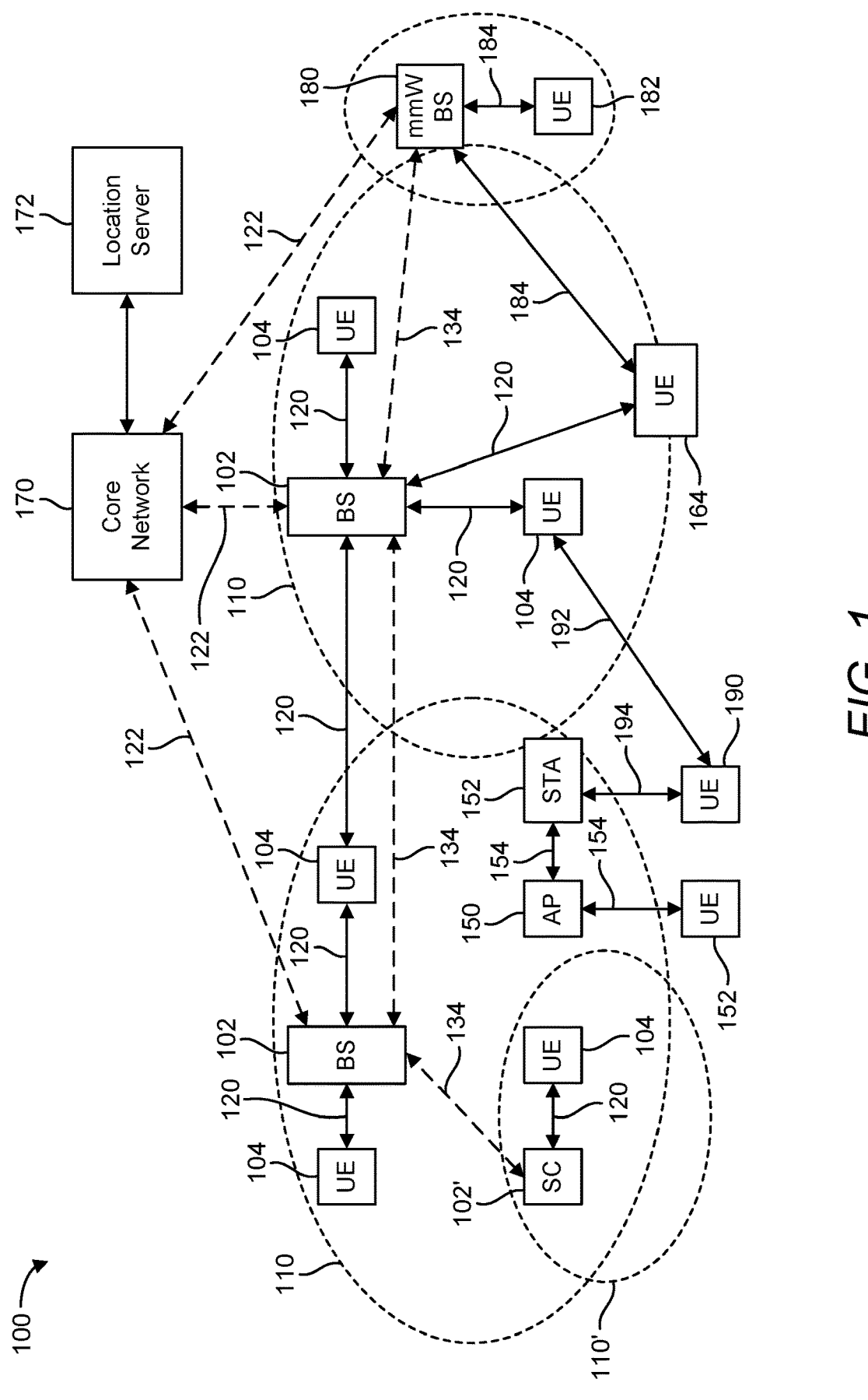
FIG. 1 illustrates an example wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT)

device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/

182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
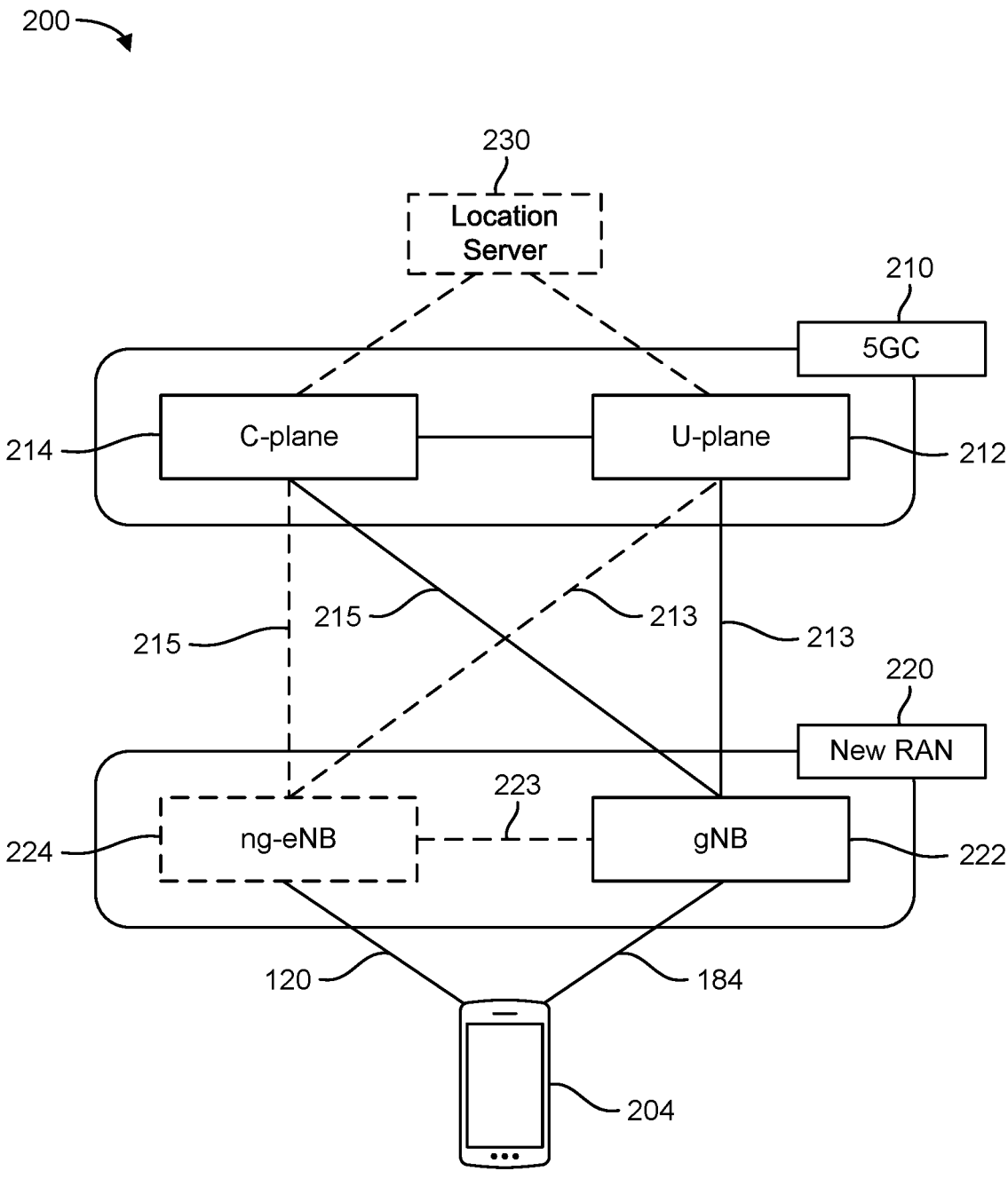

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
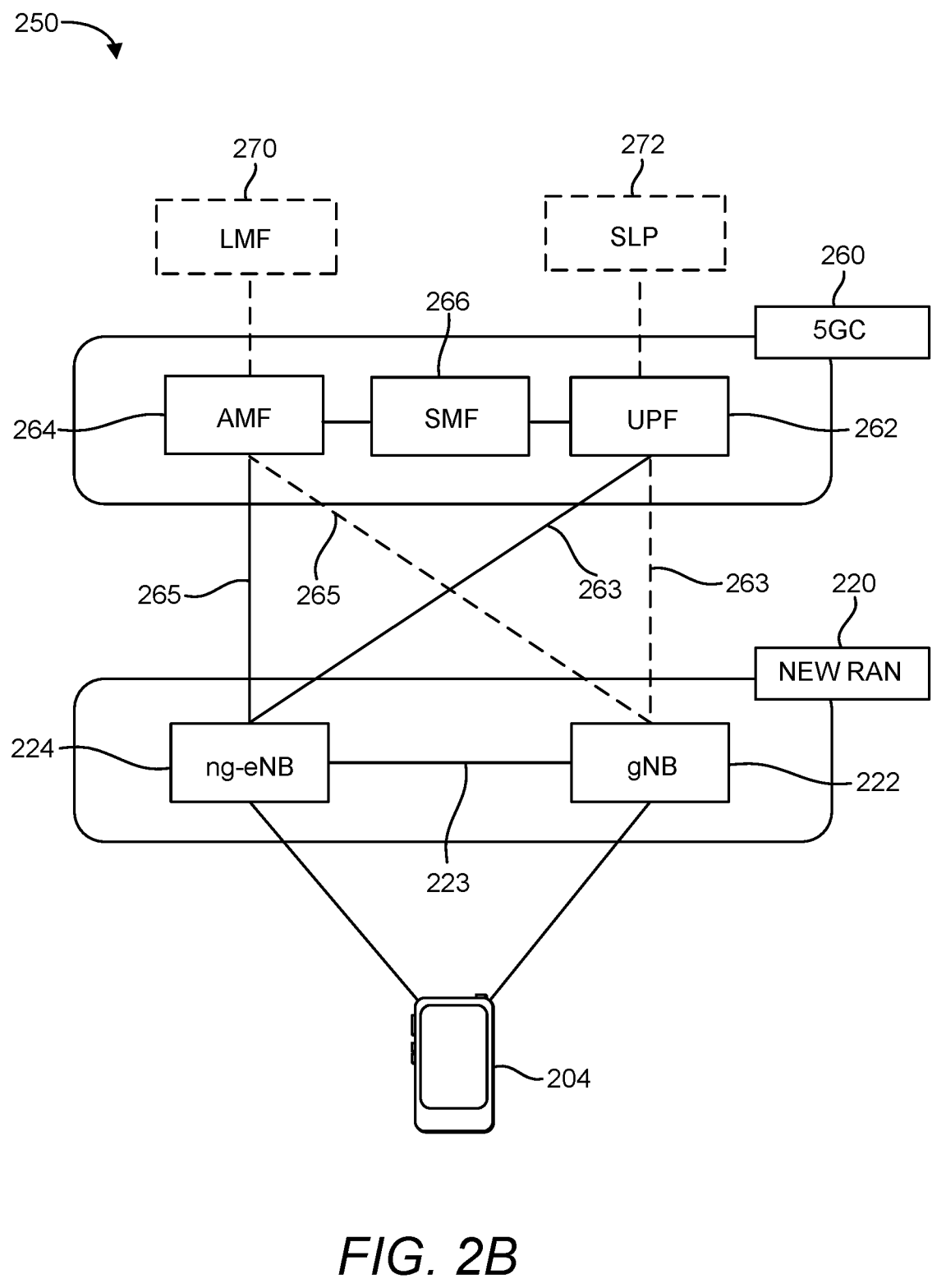

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
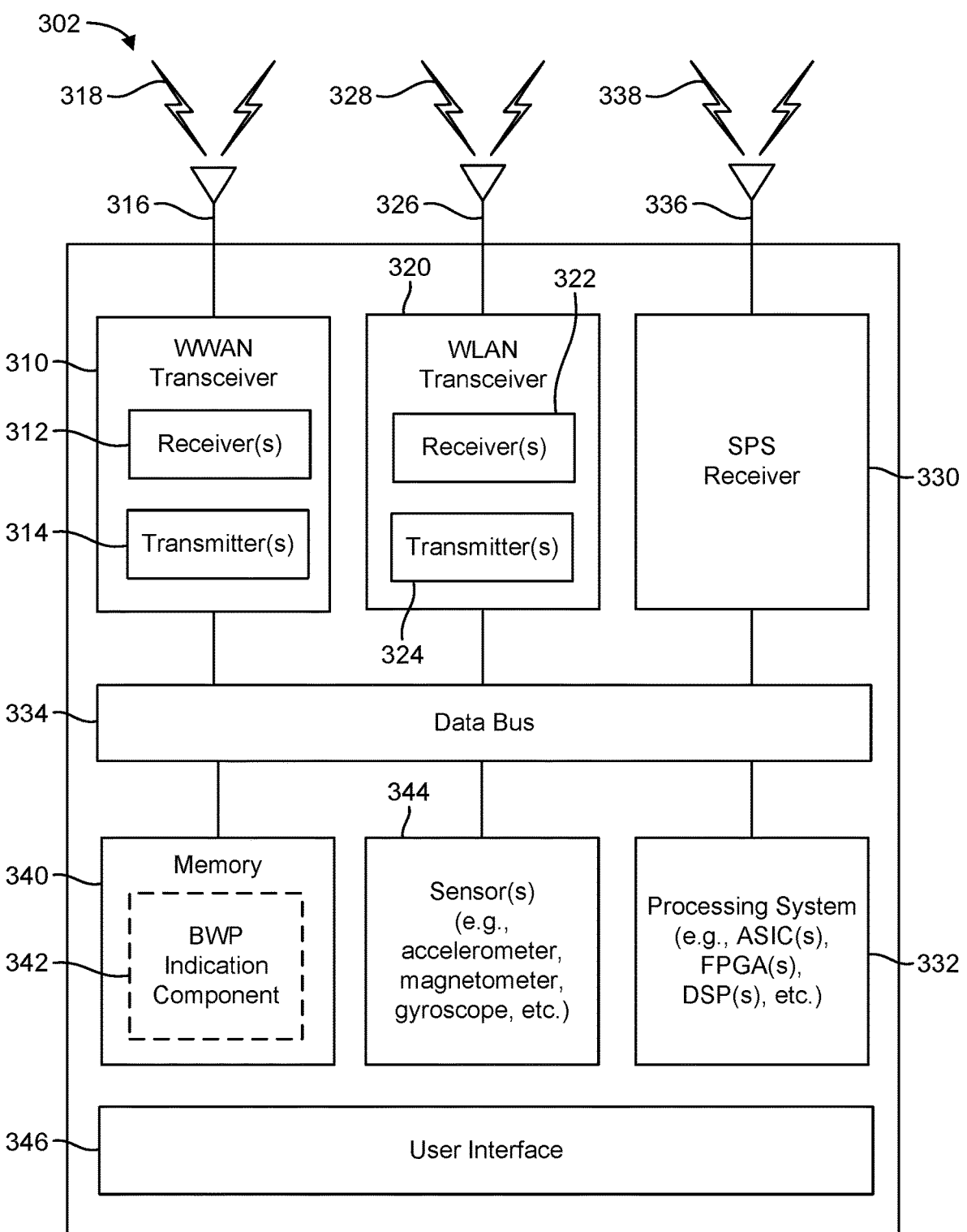
FIGS. 3A to 3C are simplified block diagrams of several sample aspects of components that may be employed in wireless communication nodes and configured to support communication as taught herein.
Figure 3B:
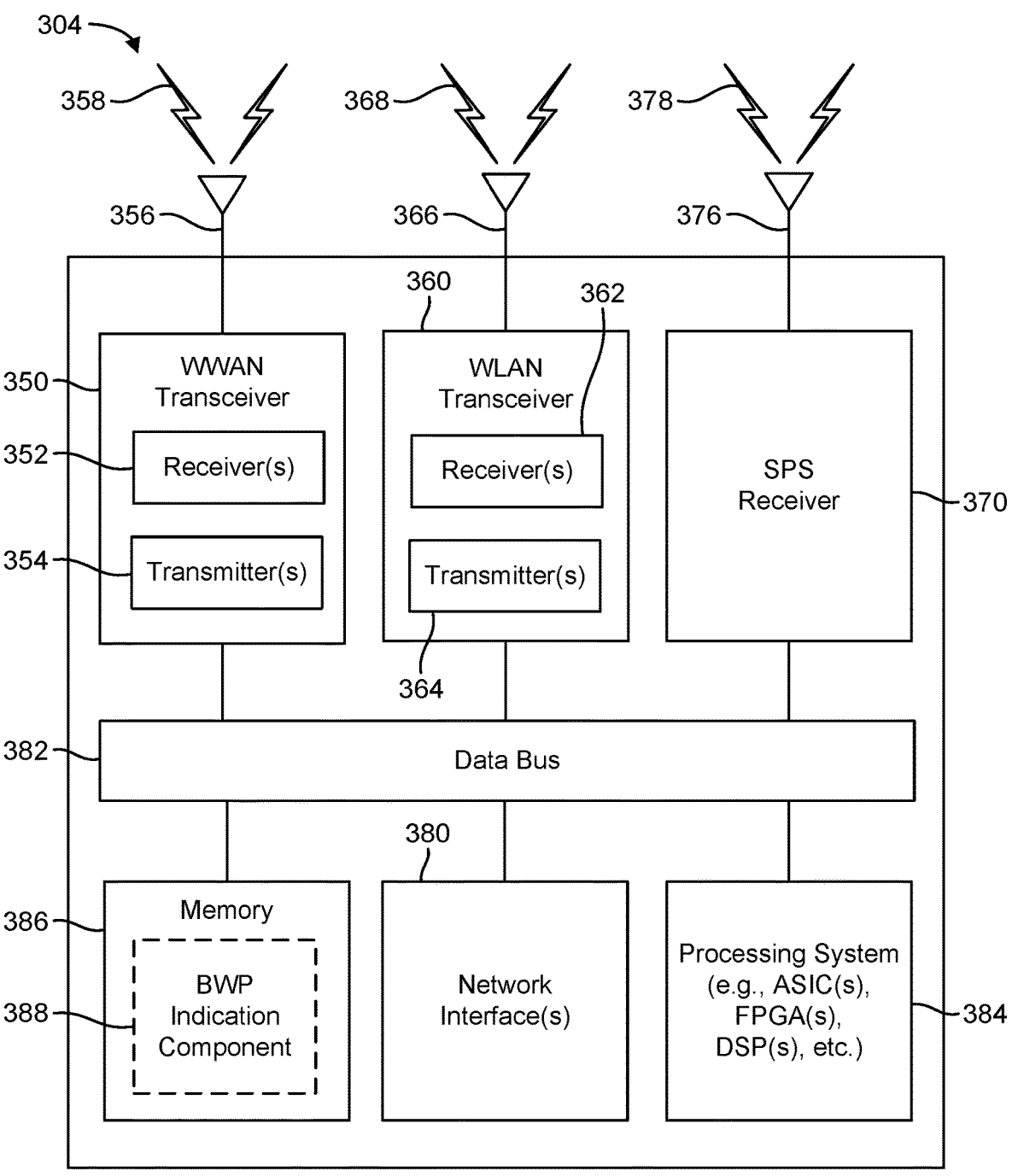
Figure 3C:
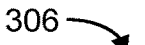

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304, respectively, may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and perform calculations necessary to determine positions of the UE 302 and the base station 304 using measurements obtained by any suitable SPS algorithm.

The base station 304 and the network entity 306 each include at least one network interface 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, providing BWP indications in positioning measurement reports as disclosed herein, and for providing other processing functionality. The base station 304 includes a processing system 384 for providing functionality relating to, for example, receiving BWP indications in positioning measurement reports as disclosed herein, and for providing other processing functionality. The network entity 306 includes a processing system 394 for providing functionality relating to, for example, receiving BWP indications in positioning measurement reports as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include BWP indication components 342, 388, and 398, respectively. BWP indication components 342, 388, and 398 may be hardware circuits that are part of or coupled to the processing systems 332, 384, and 394, respectively, that, when executed, cause the UE 302, the base station 304, and the network entity 306 to perform the functionality described herein. Alternatively, the BWP indication components 342, 388, and 398 may be memory modules (as shown in FIGS. 3A-C) stored in the memory components 340, 386, and 396, respectively, that, when executed by the processing systems 332, 384, and 394, cause the UE 302, the base station 304, and the network entity 306 to perform the functionality described herein.

The UE 302 may include one or more sensors 344 coupled to the processing system 332 via a data bus 334 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the BWP indication components 342, 388, and 398, etc.

Figure 4A:
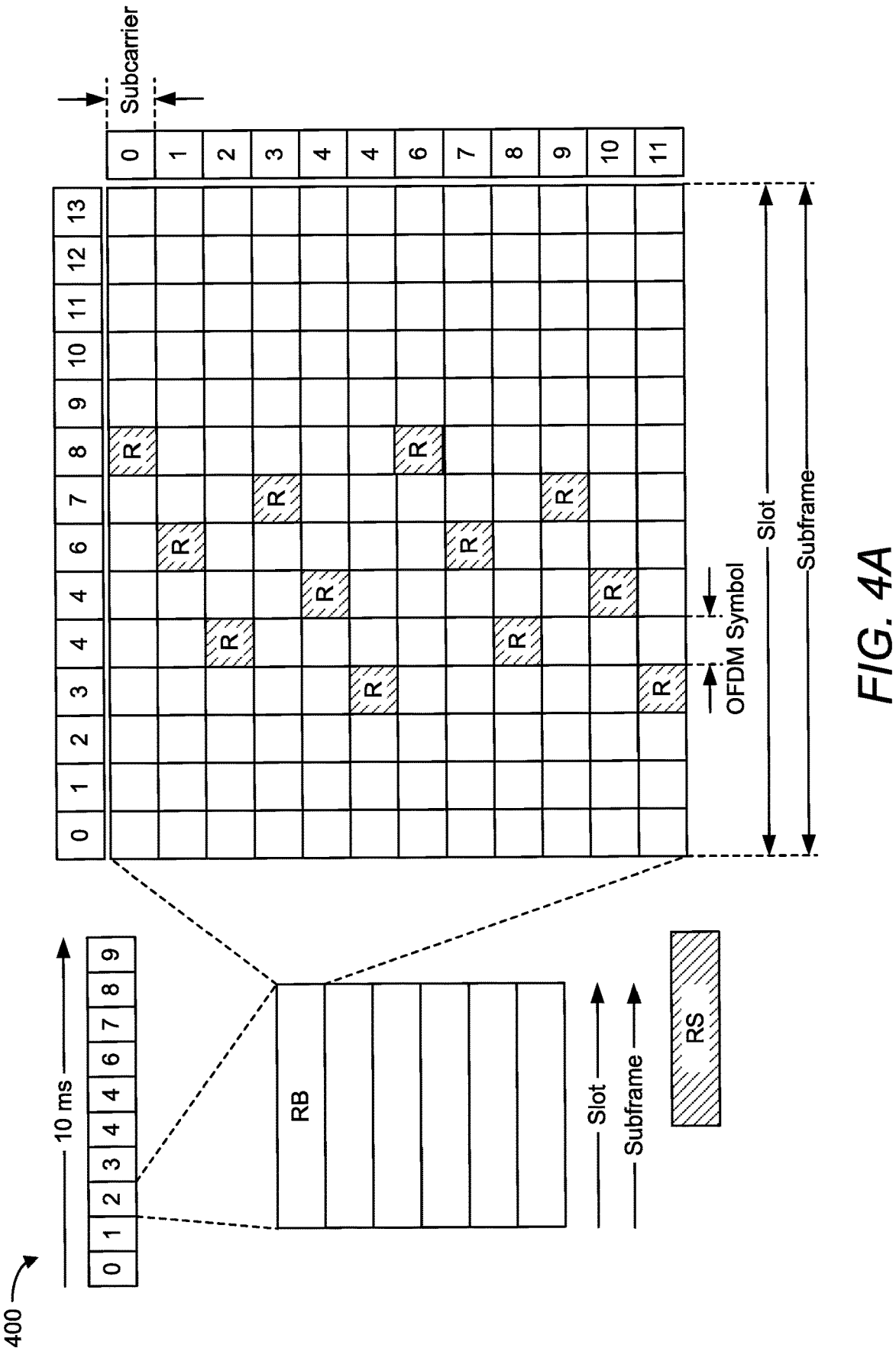
FIGS. 4A and 4B are diagrams illustrating examples of frame structures and channels within the frame structures, according to aspects of the disclosure.
Figure 4B:
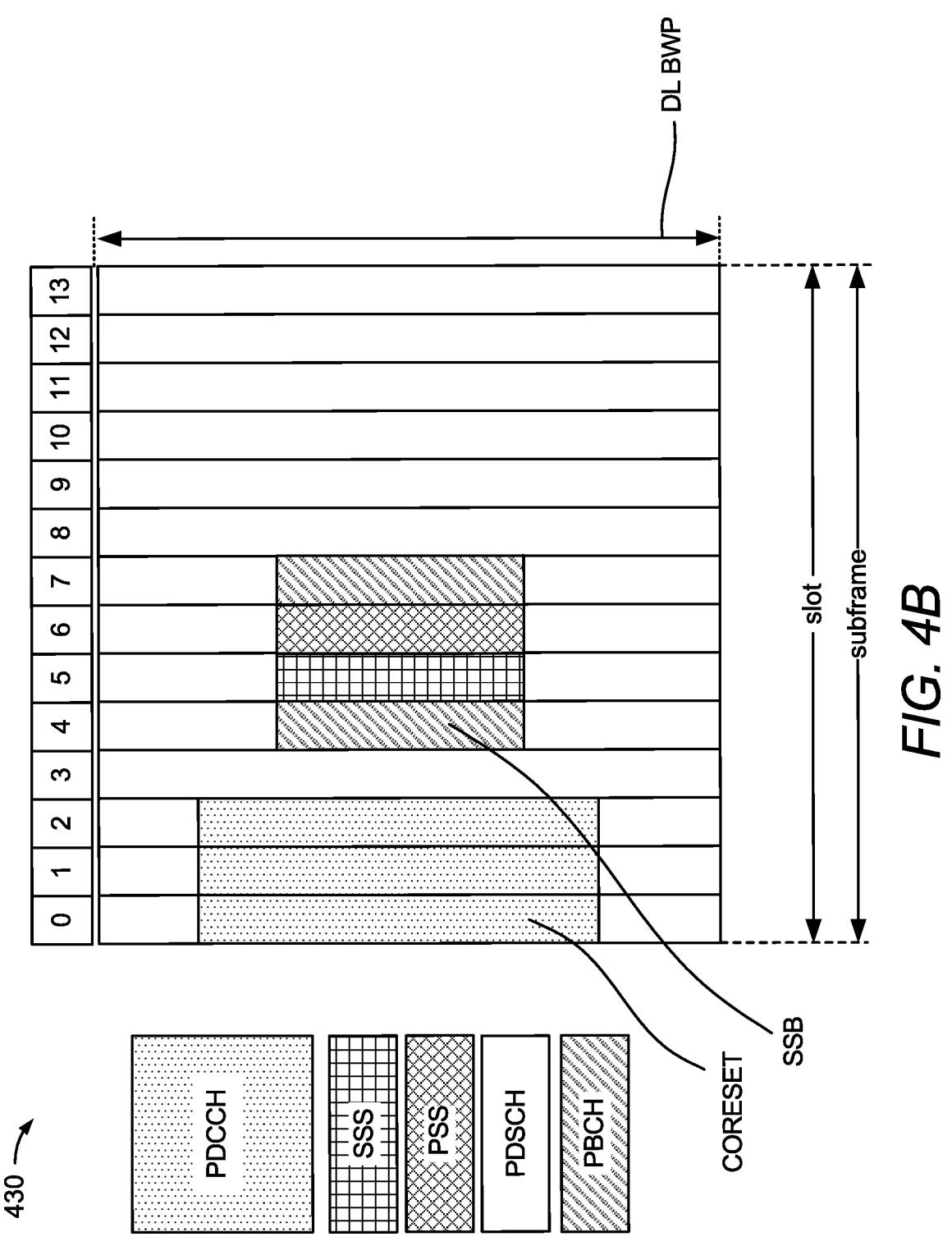

Various frame structures may be used to support downlink and uplink transmissions between network nodes (e.g., base stations and UEs). FIG. 4A is a diagram 400 illustrating an example of a DL frame structure, according to aspects of the disclosure. FIG. 4B is a diagram 430 illustrating an example of channels within the DL frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz, and 240 kHz or greater may be available. Table 1 provided below lists some various parameters for different NR numerologies.

into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fourth symbols of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is

TABLE 1

| $\mu$ | SCS (kHz) | Symbols/ Sot | Slots/ Subframe | Slots/ Frame | Slot Duration (ms) | Symbol Duration ($\mu$s) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the examples of FIGS. 4A and 4B, a numerology of 15 kHz is used. Thus, in the time domain, a 10 millisecond (ms) frame is divided into 10 equally sized subframes of 1 ms each, and each subframe includes one time slot. In FIGS. 4A and 4B, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided associated with a particular TRP (identified by a TRP ID). In addition, the PRS resources in a PRS resource set have the same periodicity, a common muting pattern configuration, and the same repetition factor (such as PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^\mu \cdot \{4, 5, 8, 10, 16, 20, 32, 40, 64, 80, 160, 320, 640, 1280, 2560, 5120, 10240\}$ slots, with $\mu$=0, 1, 2, 3. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. THE downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (such as up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

Figure 5:
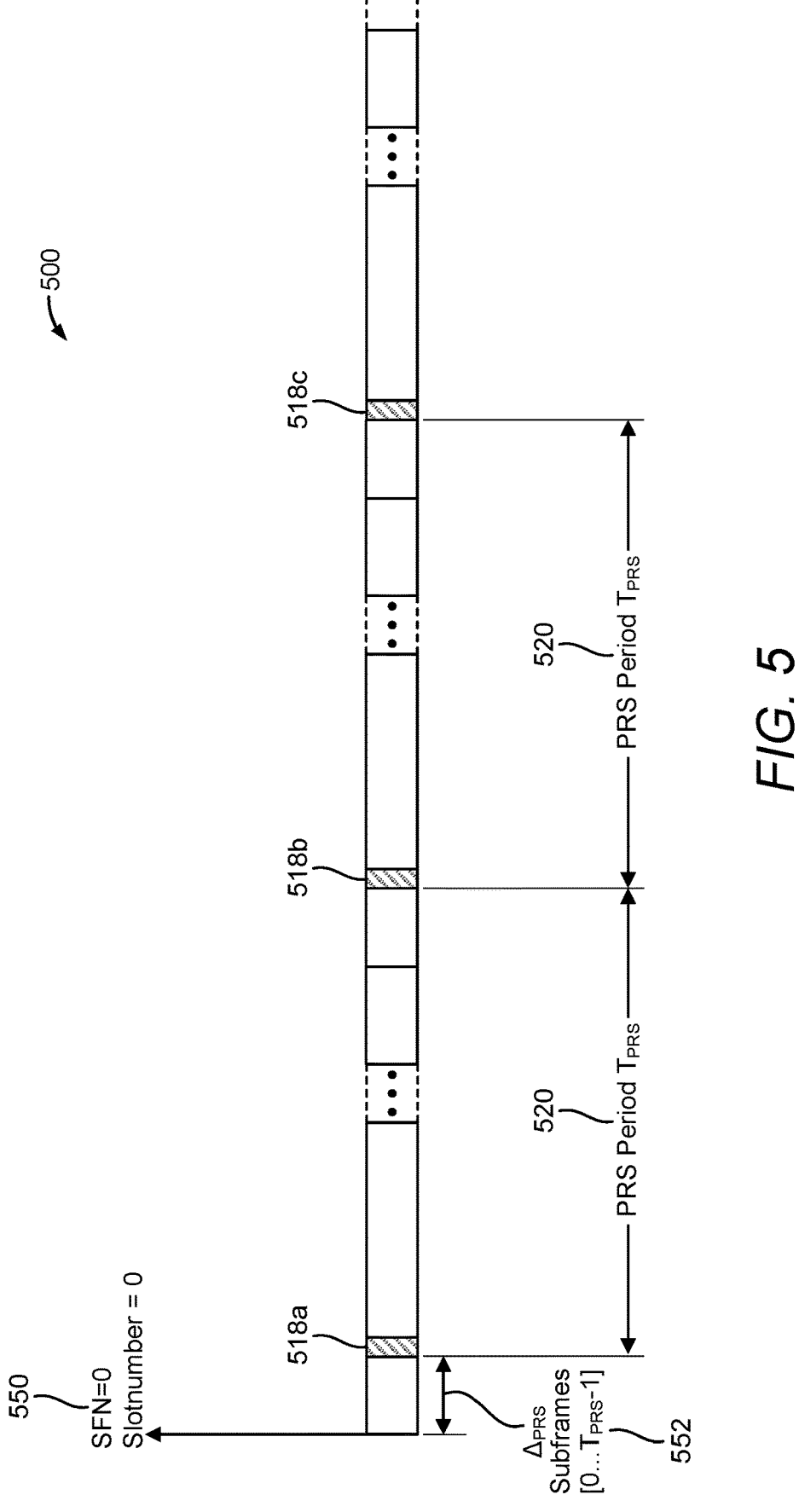
FIGS. 5 and 6 illustrate example PRS configurations for a cell supported by a base station.

In some cases, the DL RS illustrated in FIG. 4A may be positioning reference signals (PRS). FIG. 5 illustrates an example PRS configuration 500 for a cell supported by a wireless node (such as a base station 102). FIG. 5 shows how PRS positioning occasions are determined by an SFN, a cell specific subframe offset ($\Delta_{PRS}$) 552, and the PRS periodicity ($T_{PRS}$) 520. Typically, the cell specific PRS subframe configuration is defined by a "PRS Configuration Index" $I_{PRS}$ included in observed time difference of arrival (OTDOA) assistance data. The PRS periodicity ($T_{PRS}$) 520 and the cell specific subframe offset ($\Delta_{PRS}$) are defined based on the PRS configuration index $I_{PRS}$, as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ − 160 |

TABLE 2-continued

| PRS configuration Index $I_{PRS}$ | PRS periodicity $T_{PRS}$ (subframes) | PRS subframe offset $\Delta_{PRS}$ (subframes) |
|---|---|---|
| 480-1119 | 640 | $I_{PRS} - 480$ |
| 1120-2399 | 1280 | $I_{PRS} - 1120$ |
| 2400-2404 | 5 | $I_{PRS} - 2400$ |
| 2405-2414 | 10 | $I_{PRS} - 2405$ |
| 2415-2434 | 20 | $I_{PRS} - 2415$ |
| 2435-2474 | 40 | $I_{PRS} - 2435$ |
| 2475-2554 | 80 | $I_{PRS} - 2475$ |
| 2555-4095 | Reserved | |

A PRS configuration is defined with reference to the SFN of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity 520, and $\Delta_{PRS}$ is the cell-specific subframe offset 552.

As shown in FIG. 5, the cell specific subframe offset $\Delta_{PRS}$ 552 may be defined in terms of the number of subframes transmitted starting from system frame number 0 (Slot 'Number 0', marked as slot 550) to the start of the first (subsequent) PRS positioning occasion. In the example in FIG. 5, the number of consecutive positioning subframes ($N_{PRS}$) in each of the consecutive PRS positioning occasions 518a, 518b, and 518c equals 4. That is, each shaded block representing PRS positioning occasions 518a, 518b, and 518c represents four subframes.

In some aspects, when a UE receives a PRS configuration index $I_{PRS}$ in the OTDOA assistance data for a particular cell, the UE may determine the PRS periodicity $T_{PRS}$ 520 and PRS subframe offset $\Delta_{PRS}$ using Table 2. The UE may then determine the radio frame, subframe, and slot when a PRS is scheduled in the cell (e.g., using the equation above). The OTDOA assistance data may be determined by, for example, the location server (e.g., location server 230, LMF 270), and includes assistance data for a reference cell, and a number of neighbor cells supported by various base stations.

Typically, PRS occasions from all cells in a network that use the same frequency are aligned in time and may have a fixed known time offset (e.g., cell-specific subframe offset 552) relative to other cells in the network that use a different frequency. In SFN-synchronous networks, all wireless nodes (e.g., base stations 102) may be aligned on both frame boundary and system frame number. Therefore, in SFN-synchronous networks, all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE may determine the timing of the PRS occasions of the reference and neighbor cells for OTDOA positioning, if the UE can obtain the cell timing (e.g., SFN) of at least one of the cells, e.g., the reference cell or a serving cell. The timing of the other cells may then be derived by the UE based, for example, on the assumption that PRS occasions from different cells overlap.

For LTE systems, the sequence of subframes used to transmit PRS (e.g., for OTDOA positioning) may be characterized and defined by a number of parameters, comprising: (i) a reserved block of bandwidth (BW), (ii) the configuration index $I_{PRS}$, (iii) the duration $N_{PRS}$, (iv) an optional muting pattern, and (v) a muting sequence periodicity $T_{REP}$ that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth value can be increased to the system bandwidth (e.g., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of the LTE positioning protocol (LPP). A directional PRS may be configured and may, for example, use a low PRS duty cycle (e.g., $N_{PRS}=1$, $T_{PRS}=160$ subframes) or a high duty cycle.

Figure 6:
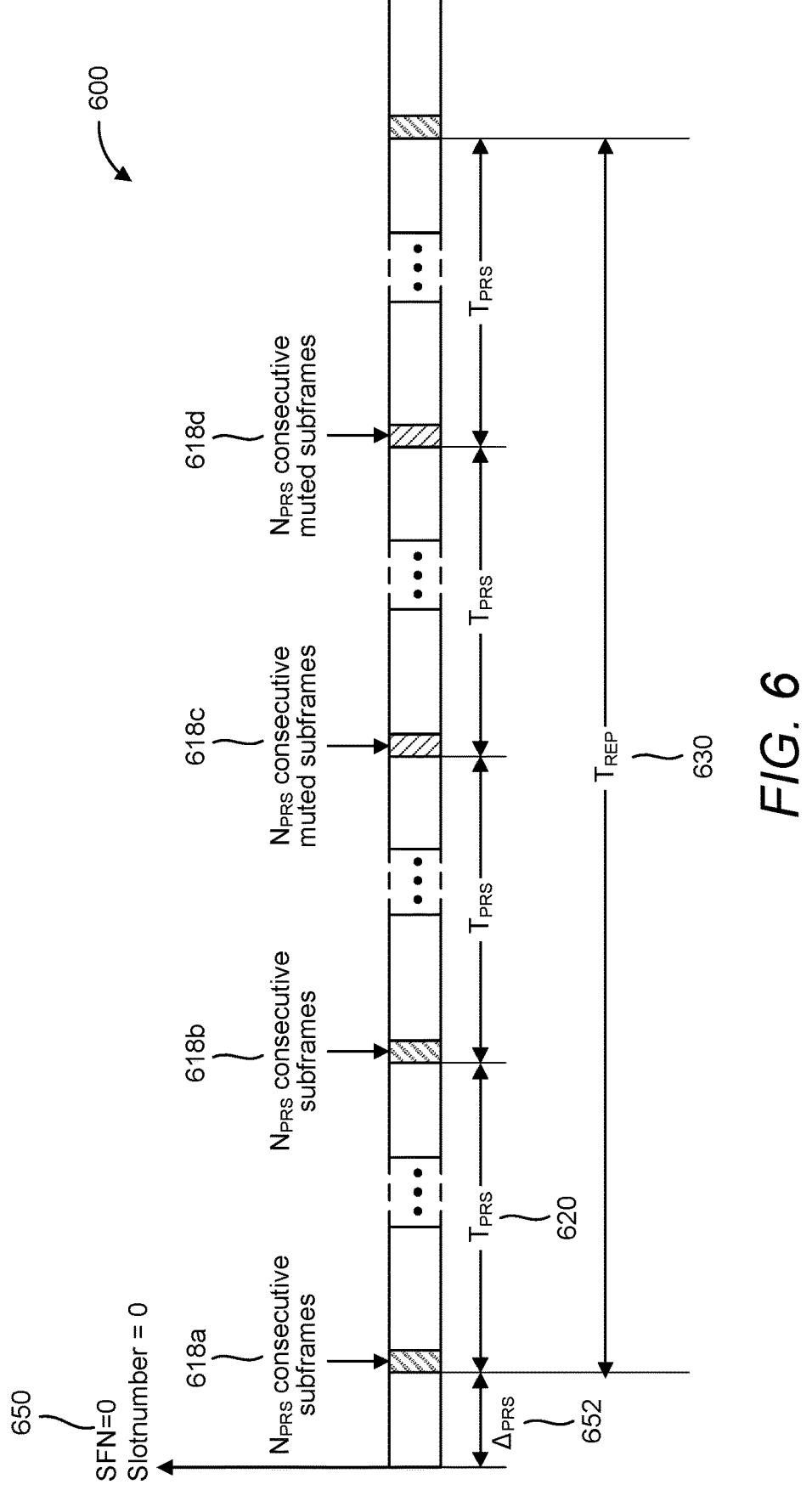

FIG. 6 illustrates an example PRS configuration 600 in LTE that includes a PRS muting sequence. Like FIG. 5, FIG. 6 shows how PRS positioning occasions are determined by an SFN, a cell specific subframe offset (APRS) 652, and the PRS Periodicity ($T_{PRS}$) 620. As shown in FIG. 6, the cell specific subframe offset $\Delta_{PRS}$ 652 may be defined in terms of the number of subframes transmitted starting from system frame number 0 (Slot 'Number 0', marked as slot 650) to the start of the first (subsequent) PRS positioning occasion. In the example in FIG. 6, the number of consecutive positioning subframes ($N_{PRS}$) in each of the consecutive PRS positioning occasions 618a and 618b equals 4.

Within each positioning occasion, PRS are generally transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (ToA) and reference signal time difference (RSTD) measurement, by UEs (such as the UE 104), of PRS signals that are not muted (by avoiding interference from PRS signals that have been muted). For example, when the (strong) PRS signal the UE 104 receives from one base station 102 is muted, the (weak) PRS signals from a neighboring base station 102 can be more easily detected by the UE 104. Muting may be viewed as the non-transmission of a PRS for a given positioning occasion for a particular cell. Muting patterns (also referred to as muting sequences) may be signaled to a UE 104 using bit strings. For example, in a bit string signaled to indicate a muting pattern, if a bit at position j is set to '0', then the UE 104 may infer that the PRS is muted for a $j^{th}$ positioning occasion.

With reference to FIG. 6, the muting sequence periodicity $T_{REP}$ 630 includes two consecutive PRS positioning occasions 618a and 618b followed by two consecutive muted PRS positioning occasions 618c and 618d. In LTE, the PRS muting configuration of a cell is only defined by a periodic muting sequence (e.g., muting sequence periodicity $T_{REP}$ 630), as opposed to an aperiodic or semi-persistent muting sequence. As such, the two consecutive PRS positioning occasions 618a and 618b followed by the two consecutive muted PRS positioning occasions 618c and 618d will repeat for the next muting sequence periodicity $T_{REP}$ 630.

To further improve hearability of PRS, positioning subframes may be low-interference subframes that are transmitted without user data channels. As a result, in ideally synchronized networks, PRS may receive interference from other cell's PRS with the same PRS pattern index (i.e., with the same frequency shift), but not from data transmissions. The frequency shift, in LTE, for example, is defined as a function of a PRS ID for a cell or other transmission point (TP) (denoted as $$N_{ID}^{PRS})$$

or as a function of a physical cell identifier (PCI) (denoted as $$N_{ID}^{cell})$$

if no PRS ID is assigned, which results in an effective frequency re-use factor of 6.

To also improve hearability of a PRS (e.g., when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by a wireless node may support more than one PRS configuration (e.g., PRS configuration 400/500), where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics such as a distinct direction of transmission, a distinct range of horizontal angles and/or a distinct range of vertical angles. Further enhancements of a PRS may also be supported by a wireless node.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS as defined in LTE and 5G, TRS, PTRS, CRS, CSI-RS, DMRS, PSS, SSS, SSB, SRS, UL-PRS, etc. In addition, the terms "positioning reference signal" and "PRS" refer to downlink or uplink positioning reference signals, unless otherwise indicated. A downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 7:
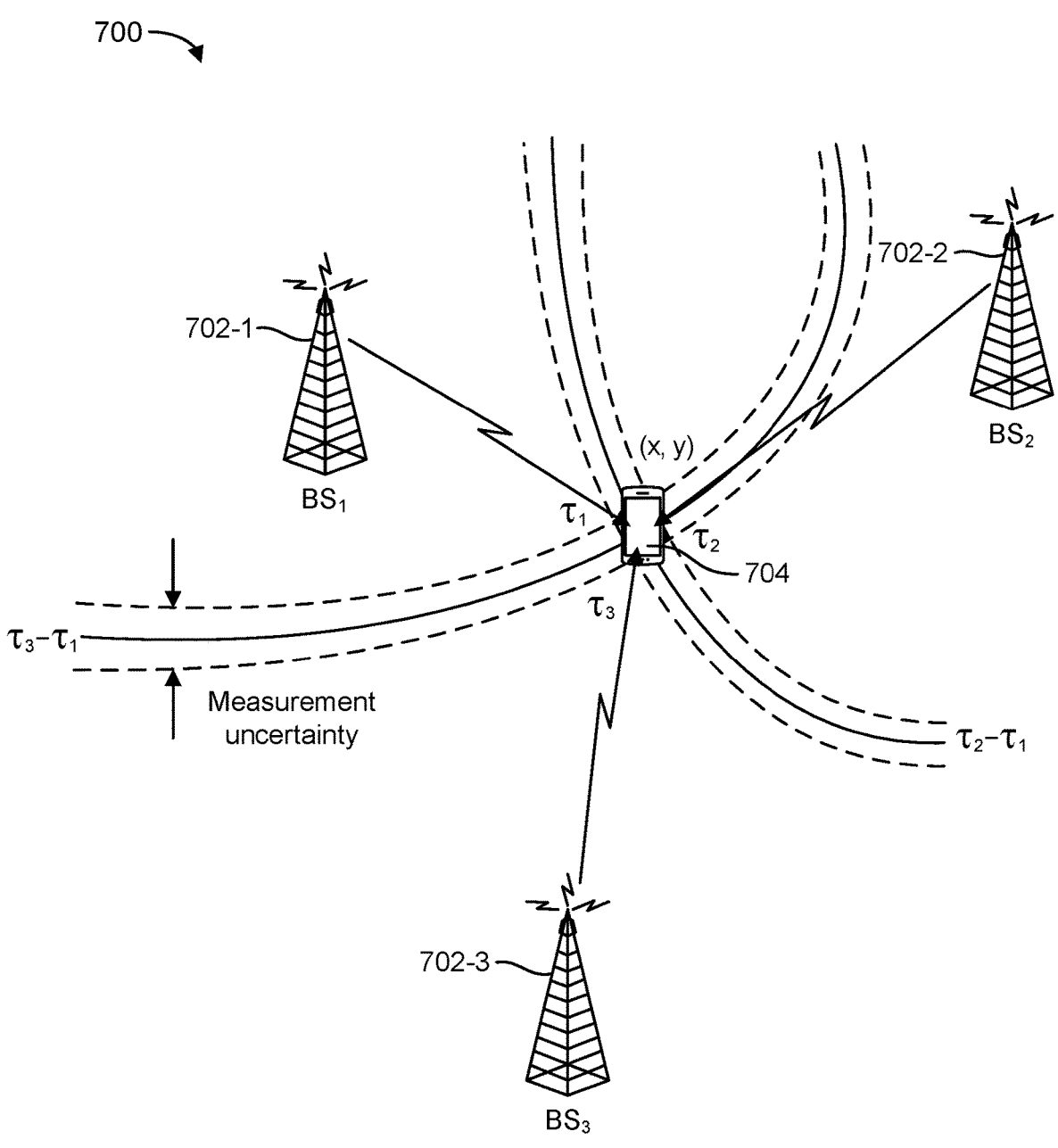
FIG. 7 is a diagram illustrating an example technique for determining a position of a UE using information obtained from a plurality of base stations.

FIG. 7 illustrates an example wireless communications system 700 according to various aspects of the disclosure. In the example of FIG. 7, a UE 704, which may correspond to any of the UEs described herein, is attempting to calculate an estimate of its position, or assist another entity (e.g., a base station or core network component, another UE, a location server, a third party application, etc.) to calculate an estimate of its position. The UE 704 may communicate wirelessly with a plurality of base stations 702-1, 702-2, and 702-3 (collectively, base stations 702), which may correspond to any combination of the base stations described herein, using RF signals and standardized protocols for the modulation of the RF signals and the exchange of information packets. By extracting different types of information from the exchanged RF signals, and utilizing the layout of the wireless communications system 700 (e.g., the base stations locations, geometry, etc.), the UE 704 may determine its position, or assist in the determination of its position, in a predefined reference coordinate system. In an aspect, the UE 704 may specify its position using a two-dimensional (2D) coordinate system; however, the aspects disclosed herein are not so limited, and may also be applicable to determining positions using a three-dimensional (3D) coordinate system, if the extra dimension is desired. Additionally, while FIG. 7 illustrates one UE 704 and four base stations 702, as will be appreciated, there may be more UEs 704 and more or fewer base stations 702.

To support position estimates, the base stations 702 may be configured to broadcast positioning reference signals (e.g., PRS, TRS, CRS, etc.) to UEs 704 in their coverage area to enable a UE 704 to measure characteristics of such reference signals. For example, the observed time difference of arrival (OTDOA) positioning method is a multilateration method in which the UE 704 measures the time difference, known as a reference signal time difference (RSTD), between specific reference signals (e.g., PRS, CRS, CSI-RS, etc.) transmitted by different pairs of network nodes (e.g., base stations 702, antennas of base stations 702, etc.) and either reports these time differences to a location server, such as the location server 230 or LMF 270, or computes a location estimate itself from these time differences.

Generally, RSTDs are measured between a reference network node (e.g., base station 702-1 in the example of FIG. 7) and one or more neighbor network nodes (e.g., base stations 702-2 and 702-3 in the example of FIG. 7). The reference network node remains the same for all RSTDs measured by the UE 704 for any single positioning use of OTDOA and would typically correspond to the serving cell for the UE 704 or another nearby cell with good signal strength at the UE 704. In an aspect, where a measured network node is a cell supported by a base station, the neighbor network nodes would normally be cells supported by base stations different from the base station for the reference cell and may have good or poor signal strength at the UE 704. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server 230, LMF 270) may provide OTDOA assistance data to the UE 704 for the reference network node (e.g., base station 702-1 in the example of FIG. 7) and the neighbor network nodes (e.g., base stations 702-2 and 702-3 in the example of FIG. 7) relative to the reference network node. For example, the assistance data may provide the center channel frequency of each network node, various reference signal configuration parameters (e.g., the number of consecutive positioning subframes, periodicity of positioning subframes, muting sequence, frequency hopping sequence, reference signal identifier (ID), reference signal bandwidth), a network node global ID, and/or other cell related parameters applicable to OTDOA. The OTDOA assistance data may indicate the serving cell for the UE 704 as the reference network node.

In some cases, OTDOA assistance data may also include "expected RSTD" parameters, which provide the UE 704 with information about the RSTD values the UE 704 is expected to measure at its current location between the reference network node and each neighbor network node, together with an uncertainty of the expected RSTD parameter. The expected RSTD, together with the associated uncertainty, may define a search window for the UE 704 within which the UE 704 is expected to measure the RSTD value. OTDOA assistance information may also include reference signal configuration information parameters, which allow a UE 704 to determine when a reference signal positioning occasion occurs on signals received from various neighbor network nodes relative to reference signal positioning occasions for the reference network node, and to determine the reference signal sequence transmitted from various network nodes in order to measure a signal time of arrival (ToA) or RSTD.

In an aspect, while the location server (e.g., location server 230, LMF 270) may send the assistance data to the UE 704, alternatively, the assistance data can originate directly from the network nodes (e.g., base stations 702) themselves (e.g., in periodically broadcasted overhead messages, etc.). Alternatively, the UE 704 can detect neighbor network nodes itself without the use of assistance data.

The UE 704 (e.g., based in part on the assistance data, if provided) can measure and (optionally) report the RSTDs between reference signals received from pairs of network nodes. Using the RSTD measurements, the known absolute or relative transmission timing of each network node, and the known position(s) of the transmitting antennas for the reference and neighboring network nodes, the network (e.g., location server 230/LMF 270, a base station 702) or the UE 704 may estimate a position of the UE 704. More particularly, the RSTD for a neighbor network node "k" relative to a reference network node "Ref" may be given as ($\mathrm{ToA}_k$–$\mathrm{ToA}_{Ref}$), where the ToA values may be measured modulo one subframe duration (1 ms) to remove the effects of measuring different subframes at different times. In the example of FIG. 7, the measured time differences between the reference cell of base station 702-1 and the cells of neighboring base stations 702-2 and 702-3 are represented as $\tau_2$–$\tau_1$ and $\tau_3$–$\tau_1$, where $\tau_1$, $\tau_2$, and $\tau_3$ represent the ToA of a reference signal from the transmitting antenna(s) of base station 702-1, 702-2, and 702-3, respectively. The UE 704 may then convert the ToA measurements for different network nodes to RSTD measurements and (optionally) send them to the location server 230/LMF 270. Using (i) the RSTD measurements, (ii) the known absolute or relative transmission timing of each network node, (iii) the known position(s) of physical transmitting antennas for the reference and neighboring network nodes, and/or (iv) directional reference signal characteristics such as a direction of transmission, the UE's 704 position may be determined (either by the UE 704 or the location server 230/LMF 270).

Still referring to FIG. 7, when the UE 704 obtains a location estimate using OTDOA measured time differences, the necessary additional data (e.g., the network nodes' locations and relative transmission timing) may be provided to the UE 704 by a location server (e.g., location server 230, LMF 270). In some implementations, a location estimate for the UE 704 may be obtained (e.g., by the UE 704 itself or by the location server 230/LMF 270) from OTDOA measured time differences and from other measurements made by the UE 704 (e.g., measurements of signal timing from GPS or other global navigation satellite system (GNSS) satellites). In these implementations, known as hybrid positioning, the OTDOA measurements may contribute towards obtaining the UE's 704 location estimate but may not wholly determine the location estimate.

Uplink time difference of arrival (UTDOA) is a similar positioning method to OTDOA, but is based on uplink reference signals (e.g., SRS, UL PRS) transmitted by the UE (e.g., UE 704). Further, transmission and/or reception beamforming at the base station 702 and/or UE 704 can enable wideband bandwidth at the cell edge for increased precision. Beam refinements may also leverage channel reciprocity procedures in 5G NR.

In NR, there may not be a requirement for precise timing synchronization across the network. Instead, it may be sufficient to have coarse time-synchronization across gNBs (e.g., within a cyclic prefix (CP) duration of the OFDM symbols). Round-trip-time (RTT)-based methods generally only need coarse timing synchronization, and as such, are a common positioning method in NR.

Figure 8:
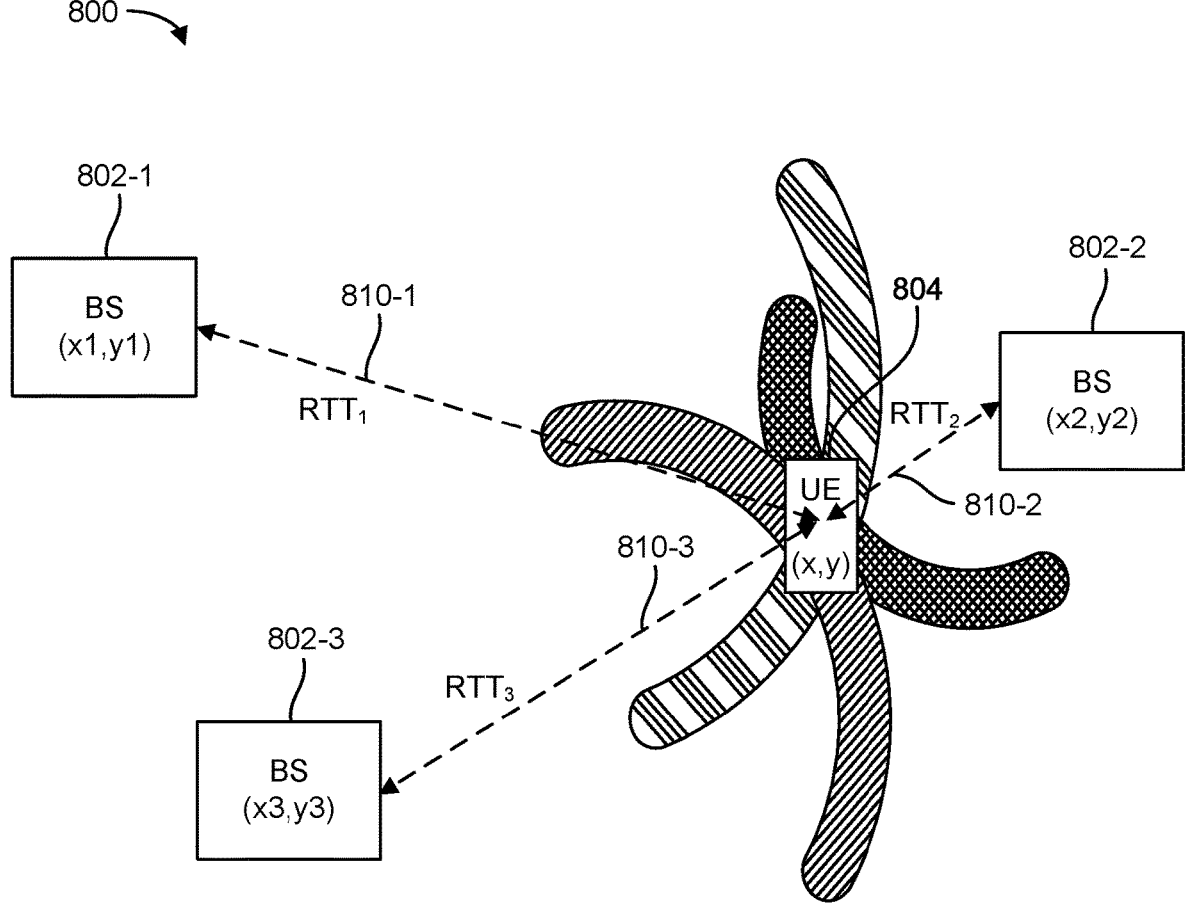
FIG. 8 is a diagram illustrating an example technique for determining a position of a mobile device using information obtained from a plurality of base stations.

FIG. 8 illustrates an example wireless communications system 800 according to aspects of the disclosure. In the example of FIG. 8, a UE 804 (which may correspond to any of the UEs described herein) is attempting to calculate an estimate of its position, or assist another entity (e.g., a base station or core network component, another UE, a location server, a third party application, etc.) to calculate an estimate of its position. The UE 804 may communicate wirelessly with a plurality of base stations 802-1, 802-2, and 802-3 (collectively, base stations 802, and which may correspond to any of the base stations described herein) using RF signals and standardized protocols for the modulation of the RF signals and the exchange of information packets. By extracting different types of information from the exchanged RF signals, and utilizing the layout of the wireless communications system 800 (i.e., the base stations' locations, geometry, etc.), the UE 804 may determine its position, or assist in the determination of its position, in a predefined reference coordinate system. In an aspect, the UE 804 may specify its position using a two-dimensional coordinate system; however, the aspects disclosed herein are not so limited, and may also be applicable to determining positions using a three-dimensional coordinate system, if the extra dimension is desired. Additionally, while FIG. 8 illustrates one UE 804 and three base stations 802, as will be appreciated, there may be more UEs 804 and more base stations 802.

To support position estimates, the base stations 802 may be configured to broadcast reference RF signals (e.g., PRS, CRS, TRS, etc.) to UEs 804 in their coverage area to enable a UE 804 to measure characteristics of such reference RF signals. For example, the UE 804 may measure the ToA of specific reference RF signals (e.g., PRS, CRS, TRS, etc.) transmitted by at least three different base stations 802 and may use the RTT positioning method to report these ToAs and the time difference between reception of the reference RF signals and transmission of the corresponding uplink response signal (e.g., SRS, UL PRS), referred to as the "UE Rx-Tx" measurement, back to the serving base station 802 or another positioning entity (e.g., location server 230, LMF 270).

In an aspect, although described as the UE 804 measuring reference RF signals from a base station 802, the UE 804 may measure reference RF signals from one of multiple cells supported by a base station 802. Where the UE 804 measures reference RF signals transmitted by a cell supported by a base station 802, the at least two other reference RF signals measured by the UE 804 to perform the RTT procedure would be from cells supported by base stations 802 different from the first base station 802 and may have good or poor signal strength at the UE 804.

In order to determine the position (x, y) of the UE 804, the entity determining the position of the UE 804 needs to know the locations of the base stations 802, which may be represented in a reference coordinate system as $(x_k, y_k)$, where k=1, 2, 3 in the example of FIG. 8. Where one of the base stations 802 (e.g., the serving base station) or the UE 804 determines the position of the UE 804, the locations of the involved base stations 802 may be provided to the serving base station 802 or the UE 804 by a location server with knowledge of the network geometry (e.g., location server 230, LMF 270). Alternatively, the location server may determine the position of the UE 804 using the known network geometry.

Either the UE 804 or the respective base station 802 may determine the distance $(d_k$, where k=1, 2, 3) between the UE 804 and the respective base station 802. In an aspect, determining the RTT 810 of signals exchanged between the UE 804 and any base station 802 can be performed and converted to a distance $(d_k)$. RTT techniques measure the time between sending an RTT measurement signal (i.e., a DL or UL reference RF signal) and receiving an RTT response signal (i.e., an UL or DL reference RF signal). To determine the actual propagation time between the transmitter and receiver, the transmitter (a base station for network-based RTT or a UE for UE-based RTT) measures and reports the time difference between sending the RTT measurement signal and receiving the RTT response signal, referred to as the "Tx-Rx" measurement ("BS Tx-Rx" for network-based RTT, "UE Tx-Rx" for UE-based RTT). The receiver measures and reports the time difference between receiving the RTT measurement signal and sending the RTT response signal, referred to as the "Rx-Tx" measurement ("UE Rx-Tx" for network-based RTT, "BS Rx-Tx" for UE-based RTT). The positioning entity (a location server, the serving base station 802, the UE 804, or other network entity) subtracts the Rx-Tx measurement from the Tx-Rx measurement to determine the propagation time between the transmitter and receiver. Based on the propagation time and the speed of light, the distance $d_k$ between the transmitter (e.g., base station 802) and receiver (e.g., UE 804) can be determined.

RTT methods may also utilize calibration to remove any processing delays at the base station 802 or UE 804. In some environments, it may be assumed that the processing delays for the UE 804 and the base stations 802 are the same. However, such an assumption may not be true in practice.

Once each distance $d_k$ is determined, the UE 804, a base station 802, or the location server (e.g., location server 230, LMF 270) can solve for the position (x, y) of the UE 804 by using a variety of known geometric techniques, such as, for example, trilateration. From FIG. 8, it can be seen that the position of the UE 804 ideally lies at the common intersection of three semicircles, each semicircle being defined by radius $d_k$ and center $(x_k, y_k)$, where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 804 from the location of a base station 802). The intersection of the two directions at or near the point (x, y) can provide another estimate of the location for the UE 804. For example, in AoD positioning, the transmitter (e.g., a base station 802) uses the angle of the downlink transmit beam carrying reference RF signals to a receiver (e.g., a UE 804) and the distance between the transmitter and the receiver to estimate the location of the receiver. Similarly, in AoA positioning, the receiver (e.g., a UE 804) uses the angle of the uplink receive beam on which it receives reference RF signals from a transmitter (e.g., a base station 802) and the distance between the receiver and the transmitter to estimate the location of the receiver.

Some positioning techniques also use RSRP measurements of reference RF signals received from a transmitter to determine the distance between the transmitter and the receiver. The attenuation of the reference RF signal, as indicated by the RSRP, may provide coarse information about the distance between the transmitter and the receiver.

A position estimate (e.g., for a UE 804) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

As described above, measurement reports sent by a UE for UE-assisted positioning procedures, such as RSTD measurements for OTDOA, UE Rx-Tx measurements for RTT, RSRP measurements for AOD, etc., are based on measurements of DL reference RF signals (e.g., PRS, TRS, CRS, SSB, CSI-RS, etc.). These measurement reports are sent by the UE to the location server (e.g., location server 230, LMF 270) via LPP. Specifically, the reports are sent through the serving base station in NAS containers that the base station cannot read.

A DL PRS configuration (e.g., as illustrated in FIGS. 5 and 6) is independent of the DL BWP. Specifically, the UE measures only the portion of the PRS in its active DL BWP. To measure a larger PRS bandwidth, the UE requests a measurement gap (as described with reference to FIG. 6) to be provided by the serving base station. Currently, a maximum of four BWPs can be specified in the DL and UL. A UE can be configured with up to four carrier BWPs on the DL, and up to four carrier BWPs on the UL. However, only one carrier BWP (UL or DL) may be active at a given time. On the DL, the bandwidth of each BWP should be equal to or greater than the bandwidth of the SSB (see FIG. 4B), but it may or may not contain the SSB.

Because the serving base station cannot decode the measurement reports from the UE, it may not be aware of the UE's positioning session with the location server, unless the UE requests a measurement gap to measure a non-serving base station's PRS.

In some cases, the UE's DL BWP may change based on RAN conditions, and the location server may not be aware of it. For example, the serving base station may reconfigure the UE's BWP, possibly in response to the UE's request (e.g., a request to reduce BWP if running low on battery power). As another example, the UE may switch to a default BWP based on the expiration of a BWP inactivity timer, as described in 3GPP technical specification (TS) 38.321 (which is publicly available and incorporated herein by reference in its entirety). Even the serving base station may, for a brief time, be unaware of this switch, such as if the UE missed a DCI that the base station sent to prevent expiration of the inactivity timer. As such, in some cases, the location server may not be aware of the PRS bandwidth that the UE used to generate the measurement report.

The present disclosure provides techniques to address this issue. As a first option, the UE can report the PRS measurement bandwidth along with the measurement report. If the UE measures all the PRS (e.g., different PRS from different base stations) using the same PRS measurement bandwidth, the UE may report a single PRS measurement bandwidth for all the PRS that it measured. Alternatively, if the UE used different PRS measurement bandwidths to measure different PRS, it can report the PRS measurement bandwidth associated with a particular PRS measurement. The PRS bandwidth may be reported as a number of RBs, or as a number of units of M (e.g., 4) RBs, where M is a minimum granularity of PRS bandwidth. As another example, the UE may report the starting and ending RBs within which it measured the PRS.

If the measured PRS bandwidth changes during a positioning session, the UE can report all the bandwidths and the periods during which they applied. Alternatively, the UE can report the bandwidth corresponding to the longest period, the earliest period, or latest duration. For example, the UE can report the bandwidth corresponding to the longest period, with ties resolved by the earliest period. As yet another alternative, the UE can be instructed to use only one bandwidth, and report which one it uses. Which bandwidth to use may be a UE implementation/capability or subject to some set of rules. For example, a rule may be to reset the measurement and use the new bandwidth if it is larger than the old bandwidth. As yet another alternative, the UE can perform some combinations of the above.

As a second option disclosed herein for making the location server aware of the measured PRS bandwidth, the UE may implicitly, rather than explicitly, report the PRS bandwidth that it measured. For example, the measured bandwidth may be reflected in the measurement accuracy or measurement quality indicated in the report. For example, RBs in the center of the bandwidth may provide better positioning performance than RBs at the edge of the bandwidth, and this may be reflected in the measurement report. Alternatively, special quality report statuses may be defined that correspond to quantized bandwidth ranges, or to indicate changes of bandwidth, and the UE may include such values in the measurement report.

As a third option, the UE can report bandwidth changes directly to the location server, although not necessarily as part of the measurement report that includes the actual measurement(s) of the PRS. Such a report may be triggered by a bandwidth change, and indicate when each change occurred. The time could be indicated based on, for example, the SFN and/or slot of the serving base station. That is, the report may include the SFN and/or slot during which the bandwidth changed.

As a fourth option disclosed herein, the UE can inform the serving base station of the ongoing LPP session with the location server, and the base station, rather than the UE, can inform the location server of any bandwidth changes via, for example, LTE positioning protocol type A (LPPa) or NR positioning protocol type A (NRPPa).

The selection of one of the above options to use may be configured at the start of the positioning session (e.g., at LPP session setup) by, for example, the location server. It may also depend on whether or not the location server is a component of the RAN and able to directly communicate with and/or direct the involved base stations. For example, if the location server is a component of the RAN, it may already be aware of the PRS bandwidth that the UE measured and may not need to receive a report.

Changes to the uplink BWP (i.e., the bandwidth over which the UE transmits uplink reference RF signals, such as SRS) can similarly impact uplink positioning measurements reported to the location server by the base station over LPPa or NRPPa (e.g., UL Rx-Tx for RTT, or UL relative ToA (RToA) for UTDOA). However, for uplink positioning, the base station is aware of UL BWP changes. In addition, in some cases, positioning entity may be fully integrated with the base station. If the positioning entity is located within a base station (e.g., a location measurement unit (LMU) within an eNB in LTE or an equivalent 5G unit such as a TRP, location server surrogate (LSS), or LMF within a gNB), it may be aware of the LPPa or NRPPa session. As such, it would not need to receive bandwidth change reports.

Thus, for uplink positioning, the base station or LMU or LMF can report the bandwidth of a measured PRS or changes to the bandwidth to the location server. The bandwidth or bandwidth change can be reported to the location server similarly to the way the UE reports the bandwidth or bandwidth change for DL positioning. In addition, it can be reported separately or as part of the measurement report of the actual measurements of the UL reference signals.

The above-described reporting mechanisms can also be applied to any other parameters besides bandwidth that may be changed by a base station, the UE, or both that may impact positioning measurements and that may not be known to the location server. For example, this could include any part of the downlink or uplink PRS configuration (e.g., as described with reference to FIGS. 5 and 6) that is set/changed locally by a base station without prior negotiation with the location server. This could also be the UE's received timing advance (TA) commands from the base station.

FIG. 9 illustrates an example method 900 of wireless communication, according to aspects of the disclosure. The method 900 may be performed by a UE (e.g., any of the UEs described herein) or a base station (e.g., any of the base stations described herein).

At 910, the UE or base station performs, during a positioning session (e.g., an LPP session), a measurement of a first PRS within a first BWP. In an aspect, where operation 910 is performed by a UE, operation 910 may be performed by WWAN transceiver 310, processing system 332, memory component 340, and/or BWP indication component 342, any or all of which may be considered means for performing this operation. In an aspect, where operation 910 is performed by a base station, operation 910 may be performed by WWAN transceiver 350, processing system 384, memory component 386, and/or BWP indication component 388, any or all of which may be considered means for performing this operation.

At 920, the UE or base station performs, during a positioning session, a measurement of a second PRS within a second BWP. In an aspect, where operation 920 is performed by a UE, operation 920 may be performed by WWAN transceiver 310, processing system 332, memory component 340, and/or BWP indication component 342, any or all of which may be considered means for performing this operation. In an aspect, where operation 920 is performed by a base station, operation 920 may be performed by WWAN transceiver 350, processing system 384, memory component 386, and/or BWP indication component 388, any or all of which may be considered means for performing this operation.

At 930, the UE or base station transmits, to a location server (e.g., location server 230, LMF 270), a measurement report including the measurement of the first PRS and the measurement of the second PRS. In an aspect, where operation 930 is performed by a UE, operation 930 may be performed by WWAN transceiver 310, processing system 332, memory component 340, and/or BWP indication component 342, any or all of which may be considered means for performing this operation. In an aspect, where operation 930 is performed by a base station, operation 930 may be performed by WWAN transceiver 350, processing system 384, memory component 386, and/or BWP indication component 388, any or all of which may be considered means for performing this operation.

At 940, the UE or base station transmits, to the location server, an indication of the first BWP, the second BWP, or both. In an aspect, where operation 940 is performed by a UE, operation 940 may be performed by WWAN transceiver 310, processing system 332, memory component 340, and/or BWP indication component 342, any or all of which may be considered means for performing this operation. In an aspect, where operation 940 is performed by a base station, operation 940 may be performed by WWAN transceiver 350, processing system 384, memory component 386, and/or BWP indication component 388, any or all of which may be considered means for performing this operation.

As will be appreciated, a technical advantage of the method 900 is that the location server being made aware of changes to the measured BWP will enable the location server to more accurately estimate the location of the UE. For example, when filtering, averaging, or otherwise combining multiple measurements, the location server can give higher weight to measurements made within a BWP with a wider BWP compared to those made using a narrower BWP, as those would be more accurate. Note that the UE may also be able to separately report an accuracy or quality metric for different measurements, which could be used for the same purpose. However, such quality reporting may be very coarse (e.g., a numeric quality indication with a range of 1 to 5), and not provide sufficient detail as to the underlying reason (such as change of BWP) that caused the difference in quality across the measurements, or the exact level of the difference in quality, which is represented more accurately by the bandwidths of the BWPs active at the time of each measurement. Thus, the indication of BWP could be considered as a more refined form of indication of measurement quality.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a receiver device, comprising:

performing, during a positioning session, a measurement of a first positioning reference signal (PRS) within a first bandwidth part (BWP);

performing, during the positioning session, a measurement of a second PRS within a second BWP;

transmitting, to a location server, a measurement report including the measurement of the first PRS and the measurement of the second PRS;

transmitting, to the location server, an indicator that a change from the first BWP to the second BWP occurred between the measurement of the first PRS and the measurement of the second PRS; and transmitting, to the location server, an indication of the first BWP, the second BWP, or both in response to the change from the first BWP to the second BWP.

2. The method of claim 1, wherein the transmitting the indication comprises:

transmitting, to the location server, an identifier of the first BWP, a time period during which the receiver device measured the first PRS within the first BWP, or both; and transmitting, to the location server, an identifier of the second BWP, a time period during which the receiver device measured the second PRS within the second BWP, or both.

3. The method of claim 1, wherein the transmitting the indication comprises:

transmitting, to the location server, an identifier of the first BWP based on the receiver device measuring the first PRS within the first BWP for a longest duration.

4. The method of claim 1, wherein the transmitting the indication comprises:

transmitting, to the location server, an identifier of the second BWP based on the receiver device measuring the second PRS last within the positioning session.

5. The method of claim 1, wherein the transmitting the indication comprises:

transmitting, to the location server, an identifier of the first BWP based on the receiver device measuring the first PRS first within the positioning session.

6. The method of claim 1, wherein the transmitting the indicator comprises:

transmitting, to the location server, a quality report status indicator indicating that the change from the first BWP to the second BWP occurred.

7. The method of claim 1, wherein the indicator indicates a time at which the change from the first BWP to the second BWP occurred.

8. The method of claim 1, wherein the indicator includes a system frame number (SFN) or a slot identifier during which the change from the first BWP to the second BWP occurred.

9. The method of claim 1, wherein the indication is included in the measurement report.

10. The method of claim 1, wherein the indication is not included in the measurement report.

11. The method of claim 1, wherein the receiver device is a user equipment (UE), and wherein the first PRS and the second PRS are downlink PRS transmitted by a base station.

12. The method of claim 1, wherein the receiver device is a base station, and wherein the first PRS and the second PRS are uplink PRS transmitted by a UE.

13. The method of claim 12, further comprising:

receiving an indication that the UE is engaged in the positioning session with the location server; and transmitting, to the location server, the indication of the first BWP, the second BWP, or both in response to reception of the indication that the UE is engaged in the positioning session.

14. A receiver device, comprising:

a memory;

one or more transceivers; and one or more processors communicatively coupled to the memory and the one or more transceivers, the one or more processors, either alone or in combination, configured to:

perform, during a positioning session, a measurement of a first positioning reference signal (PRS) within a first bandwidth part (BWP);

perform, during the positioning session, a measurement of a second PRS within a second BWP;

transmit, via the one or more transceivers, to a location server, a measurement report including the measurement of the first PRS and the measurement of the second PRS;

transmit, via the one or more transceivers, to the location server, an indicator that a change from the first BWP to the second BWP occurred between the measurement of the first PRS and the measurement of the second PRS; and transmit, via the one or more transceivers, to the location server, an indication of the first BWP, the second BWP, or both in response to the change from the first BWP to the second BWP.

15. The receiver device of claim 14, wherein the one or more processors being configured to transmit the indication comprises the one or more processors, either alone or in combination, being configured to:

transmit, via the one or more transceivers, to the location server, an identifier of the first BWP, a time period during which the receiver device measured the first PRS within the first BWP, or both; and transmit, via the one or more transceivers, to the location server, an identifier of the second BWP, a time period during which the receiver device measured the second PRS within the second BWP, or both.

16. The receiver device of claim 14, wherein the one or more processors being configured to transmit the indication comprises the one or more processors, either alone or in combination, being configured to:

transmit, via the one or more transceivers, to the location server, an identifier of the first BWP based on the receiver device measuring the first PRS within the first BWP for a longest duration.

17. The receiver device of claim 14, wherein the one or more processors being configured to transmit the indication comprises the one or more processors, either alone or in combination, being configured to:

transmit, via the one or more transceivers, to the location server, an identifier of the second BWP based on the receiver device measuring the second PRS last within the positioning session.

18. The receiver device of claim 14, wherein the one or more processors being configured to transmit the indication comprises the one or more processors, either alone or in combination, being configured to:

transmit, via the one or more transceivers, to the location server, an identifier of the first BWP based on the receiver device measuring the first PRS first within the positioning session.

19. The receiver device of claim 14, wherein the one or more processors being configured to transmit the indicator comprises the one or more processors, either alone or in combination, being configured to:

transmit, via the one or more transceivers, to the location server, a quality report status indicator indicating that the change from the first BWP to the second BWP occurred.

20. The receiver device of claim 14, wherein the indicator indicates a time at which the change from the first BWP to the second BWP occurred.

21. The receiver device of claim 14, wherein the indicator includes a system frame number (SFN) or a slot identifier during which the change from the first BWP to the second BWP occurred.

22. The receiver device of claim 14, wherein the indication is included in the measurement report.

23. The receiver device of claim 14, wherein the indication is not included in the measurement report.

24. The receiver device of claim 14, wherein the receiver device is a user equipment (UE), and wherein the first PRS and the second PRS are downlink PRS transmitted by a base station.

25. The receiver device of claim 14, wherein the receiver device is a base station, and wherein the first PRS and the second PRS are uplink PRS transmitted by a UE.

26. The receiver device of claim 25, wherein the one or more processors, either alone or in combination, are further configured to:

receive, via the at least one or more transceivers, an indication that the UE is engaged in the positioning session with the location server; and transmit, via the one or more transceivers, to the location server, the indication of the first BWP, the second BWP, or both in response to reception of the indication that the UE is engaged in the positioning session.

27. A receiver device, comprising:

means for performing, during a positioning session, a measurement of a first positioning reference signal (PRS) within a first bandwidth part (BWP);

means for performing, during the positioning session, a measurement of a second PRS within a second BWP;

means for transmitting, to a location server, a measurement report including the measurement of the first PRS and the measurement of the second PRS;

means for transmitting, to the location server, an indicator that a change from the first BWP to the second BWP occurred between the measurement of the first PRS and the measurement of the second PRS; and means for transmitting, to the location server, an indication of the first BWP, the second BWP, or both in response to the change from the first BWP to the second BWP.

28. A non-transitory computer-readable medium storing computer-executable instructions that, when executed by a receiver device, cause the receiver device to:

perform, during a positioning session, a measurement of a first positioning reference signal (PRS) within a first bandwidth part (BWP);

perform, during the positioning session, a measurement of a second PRS within a second BWP;

transmit, to a location server, a measurement report including the measurement of the first PRS and the measurement of the second PRS;

transmit, to the location server, an indicator that a change from the first BWP to the second BWP occurred between the measurement of the first PRS and the measurement of the second PRS; and transmit, to the location server, an indication of the first BWP, the second BWP, or both in response to the change from the first BWP to the second BWP.

* * * * *